Dec. 14, 1965 J. T. EVANS 3,223,830
POSITION INDICATING DEVICE
Filed March 14, 1963 4 Sheets-Sheet 1

INVENTOR.
JOHN T. EVANS
BY James J. Williams
HIS ATTORNEY

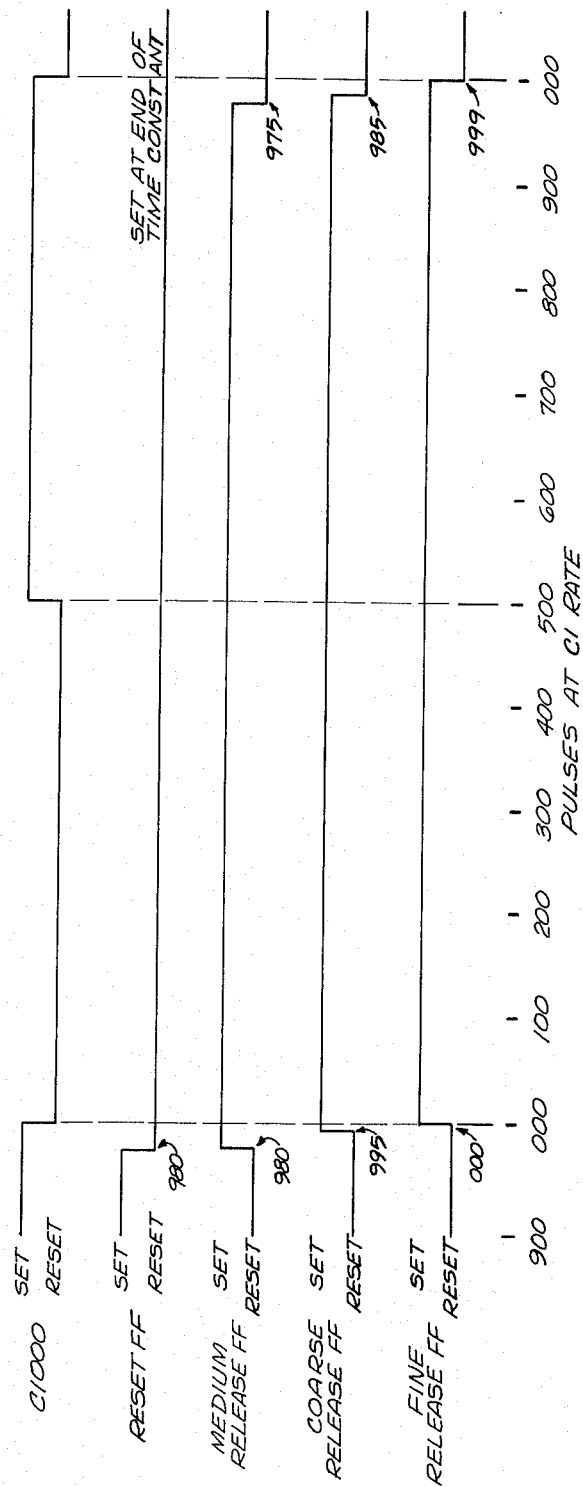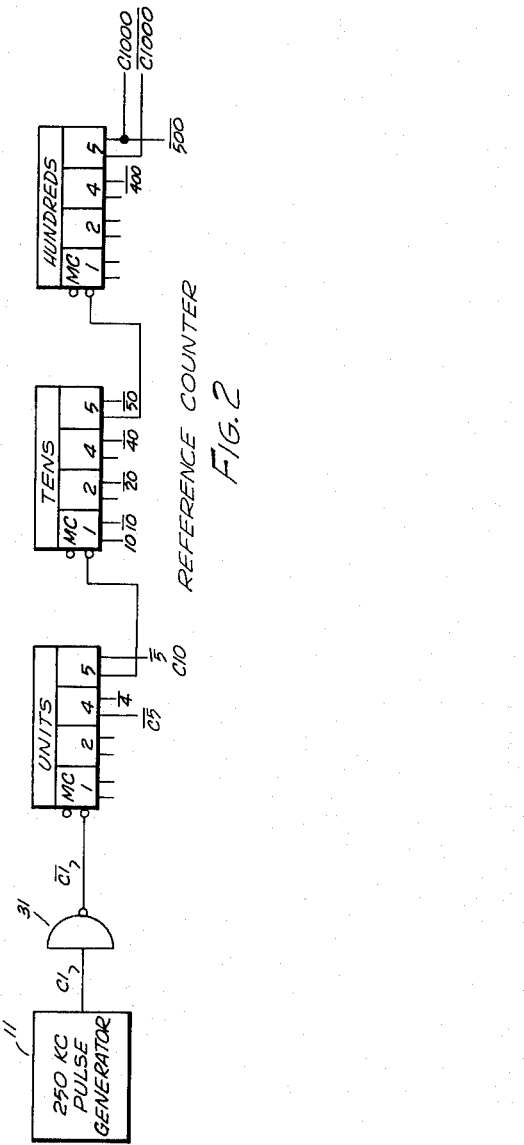

United States Patent Office 3,223,830
Patented Dec. 14, 1965

3,223,830
POSITION INDICATING DEVICE
John T. Evans, Waynesboro, Va., assignor to General Electric Company, a corporation of New York
Filed Mar. 14, 1963, Ser. No. 265,240
13 Claims. (Cl. 235—92)

The invention relates to a position indicating device, and particularly to such a device that numerically indicates position in response to a recurring signal whose phase indicates position.

Machine tool control systems are presently capable of operating machine tools or other objects in positioning or contouring functions in one, two, or three dimensions. One such control system is a numerical positioning control system in which numerical information causes a machine tool to move to a commanded position. One such numerical positioning control system is described and illustrated in a copending application entitled "Automatic Control Apparatus," filed in the name of John T. Evans on November 21, 1962, Serial No. 239,146. When a machine tool is being positioned to a commanded position in response to such a control system, it may be desirable to provide a numerical indication of the machine tool position either as it is being moved to the commanded position or after it has stopped moving and is at rest. Such an indication provides assurance that the control system is functioning properly, or can be recorded to provide a record of the position or to duplicate the position at a later time.

Accordingly, an object of the invention is to provide an improved position indicating device for use with numerical control systems.

Another object of the invention is to provide an improved position indicating device for numerically indicating the position of an object in response to recurring signals whose phase is determined by the position of an object.

The position indicating device is particularly adapted to be used with a numerical control system having position feedback devices or resolvers that produce position signals having fine, medium, and coarse significances (i.e., small, medium, and great significances) and having phases indicative of the position of a controlled object. However, in such a system, the position signals of coarse significance are less accurate because they may not reflect or indicate small changes in position. For example, the position indicating device of the invention may be used with a numerical control system which is capable of positioning between 0 and 100 inches in 0.0001 inch increments. If signals of coarse significance are considered, it will be seen that it is difficult to determine whether the first two digits indicating a position should, for example, be 39 inches or 40 inches.

Accordingly, another object of the invention is to provide a position indicating device that utilizes signals of fine significance to determine signals of coarse significance.

Briefly in accordance with the invention, a plurality of selectively enabled counters are respectively coupled to the position feedback devices or resolvers in a numerical control system. The resolvers produce recurring signals that have different significances (for example coarse, medium, and fine), and that have phases indicative of position. Means are provided for respectively permitting the recurring signals to enable the counters at predetermined times relative to a reference signal and for disabling the counters at predetermined times also relative to a reference signal. The counters begin counting when their respective recurring signals are received and they stop counting when disabled. The phase or time of the recurring resolver signals is thus converted to a count. Means, such as a visual indicator, are coupled to the counters for utilizing the count therein. Also in accordance with the invention, the counters may have overlapping significances. The counts of overlapping significances may be compared so that the more significant (coarser) counts can be corrected to conform with the less significant (finer) counts if necessary and thereby provide an accurate count.

The invention is particularly pointed out in the claims. The invention may be better understood from the following description given in connection with the accompanying drawing, in which:

FIGURE 2 shows a more detailed diagram of a reference counter used in the numerical positioning control system shown in FIGURE 1 and with a position indicating device of the invention;

FIGURE 4 shows waveforms for explaining the operation of a position indicating device of the invention.

In the specification, a description will first be given of a numerical positioning control system with which the position indicating device of the invention may be used. Then, a description will be given of the position indicating device of the invention.

NUMERICAL POSITIONING CONTROL SYSTEM—BACKGROUND

Figure 1:
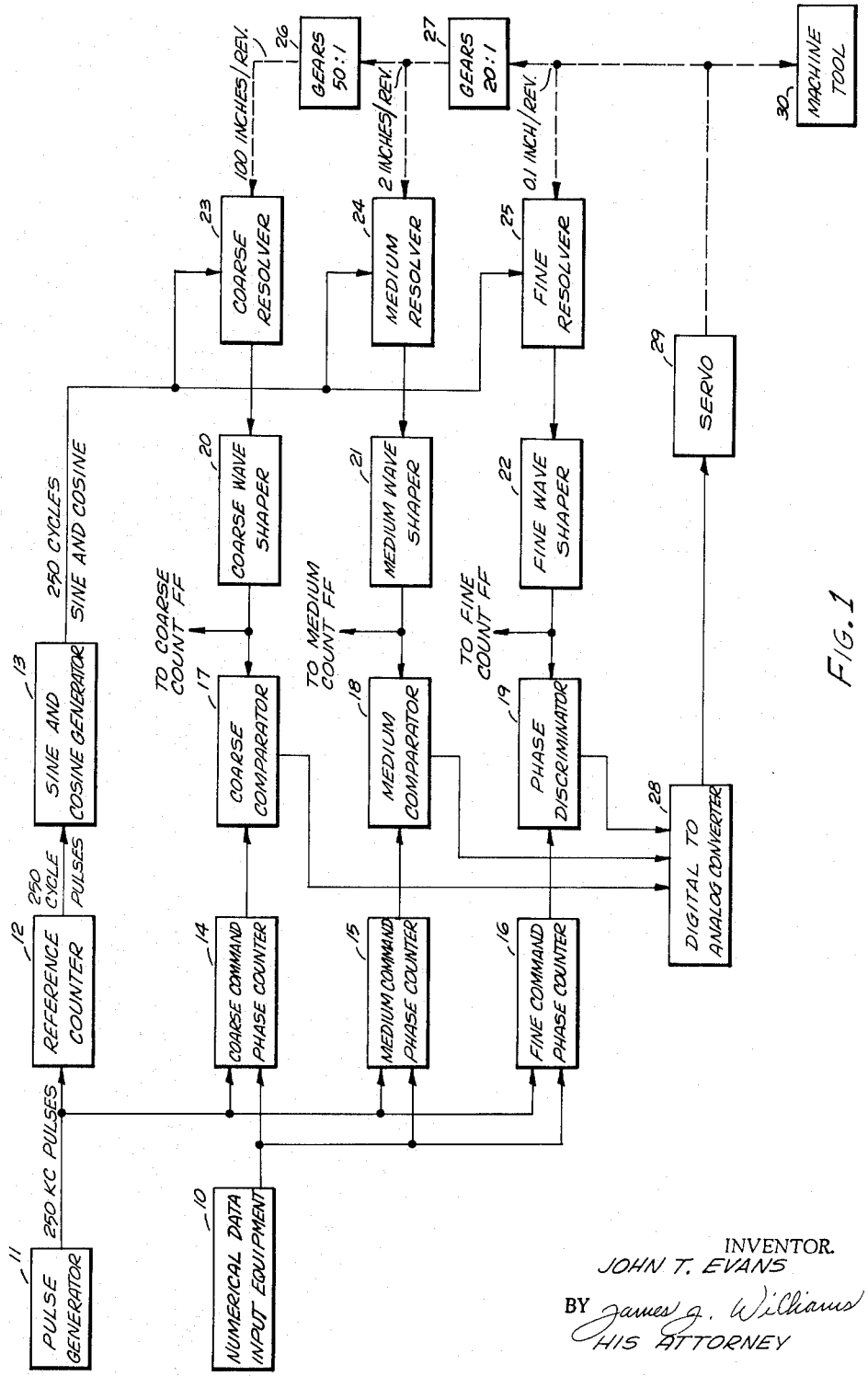
FIGURE 1 shows a block diagram of a numerical positioning control system in which a position indicating device of the invention may be used.

FIGURE 1 shows a block diagram of a machine tool numerical positioning control system with which a position indicating device of the invention may be used. The system shown in FIGURE 1 is known in the art and is described in the copending application mentioned above. While the system shown in FIGURE 1 positions in only one axis, it may position in additional axes by means of further equipment. The system includes two main sections, namely the electronic control section and the servo or operating section. The electronic control section is provided with numerical command information from numerical data input equipment 10. This command information may be on a punched tape, a punched card, or on some other medium. Typically, this information indicates the desired position of a machine tool expressed in inches from some reference point or axis, the speed at which the machine tool moves to the desired point, various other functions, and the location in the electronic control section at which the information is needed. The input equipment 10 reads the command information and the commanded addresses, and generates appropriate electrical signals for controlling the movement of the machine tool. Signals from the input equipment 10 are coupled to various elements of the control system. The control section is also provided with pulses by which the commanded information is transported and indicated in the system. These pulses are square waves which vary between a logic 0 (which in this application is plus six volts) and a logic 1 (which in this application is zero volts). The pulses are produced by a pulse generator 11 at a C1 rate (which in this application is 250 kilocycles). This C1 rate is divided or reduced by a reference counter 12 which produces pulses at various rates which are synchronized with or a sub-multiple of this C1 rate as will be indicated. The counter 12 also supplies pulses to a sine and cosine generator 13 which produces sine and cosine signals (which in this application are at 250 cycles) for use in the servo section of the system.

The numerical positioning control system of FIGURE 1 is capable of positioning a machine tool or object over a range of 100 inches in increments of 0.0001 inch. This positioning is achieved in the system by the use of a coarse rank command and associated equipment, a medium rank command and associated equipment, and a fine rank command and associated equipment. The coarse command positions in a range between 100 inches and 0.6 inch; the medium command positions in a range between 0.6 and 0.08 inch; and the fine command positions in a range between 0.08 and 0.0001 inch. Pulses at the C1 rate from the generator 11 are supplied to coarse, medium, and fine command phase counters 14, 15, 16. These counters 14, 15, 16 respond to information from the input equipment 10 and produce pulses that have a lower rate and that have phases or time occurrences (relative to pulses from the reference counter 12) respectively indicative of the coarse, medium, and fine commands. The pulses from the coarse command phase counter 14 are applied to a coarse comparator 17, the pulses from the medium command phase counter 15 are applied to a medium comparator 18, and the pulses from the fine command phase counter 16 are applied to a phase discriminator 19. The comparators 17, 18 and the discriminator 19 compare the phases of these pulses with the phases of pulses supplied by coarse, medium, and fine wave shapers 20, 21, 22. Pulses supplied by the wave shapers 20, 21, 22 have a phase indicative of the actual position of an object such as a machine tool 30. These pulses are also supplied to respective count flip-flops of the position indicating device. The comparators 17, 18 and the discriminator 19 produce digital signals indicative of the direction of motion necessary for the machine tool 30 to reach the commanded position. These signals are supplied to a digital-to-analog converter 28 which sequentially selects the signals from the coarse comparator 17, then the signals from the medium comparator 18, and then the signals from the phase discriminator 19 and produces analog signals in response to these signals, the analog signals also being indicative of the direction of motion necessary for the machine tool 30 to reach the commanded position.

In the servo section of the system, the analog signals are supplied to a servo 29 which converts the analog signals into mechanical motion (such as rotary shaft motion provided by an electric motor) which is indicated by dashed lines. This mechanical motion is coupled to and moves the machine tool 30 in any desired fashion. Typically, the mechanical motion of the servo 29 produces 0.1 inch of motion per revolution of the output shaft. This motion is coupled directly to a fine resolver 25. The motion is coupled to a medium resolver 24 through gears 27 which produce one revolution at their output for each 20 revolutions at their input. Thus, the gears 27 produce two inches of motion per revolution at their output, this being equivalent to 20 revolutions at the input of the gears 27. The motion is coupled to a coarse resolver 23 through gears 26 which produce one revolution at their output for each 50 revolutions at their input. Thus, the gears 26 produce 100 inches of motion per revolution at their output, this being equivalent to 1,000 revolutions of the output of the servo 29.

As the servo 29 moves the machine tool 30, it also causes the resolvers 23, 24, 25 to rotate. The resolvers 23, 24, 25 are supplied with sine and cosine signals (having a frequency of 250 cycles in this application) and produce signals which have a phase indicative of their shaft position. Thus, the phase of these resolver signals indicate the position of the machine tool 30 in the coarse, medium, and fine ranges. The signals from the resolvers are respectively applied to coarse, medium, and fine wave shapers 20, 21, 22 which, as indicated above, produce pulses (at the same rate or frequency of the sine and cosine signals) that have a phase indicative of position. Thus, the time occurrence or phase of these pulses is related to the 250 cycle pulses of the reference counter 12. In this application, where the resolvers are excited with signals of 250 cycles, each wave shaper produces 250 phase indicative pulses per second, this being one such pulse for each 1,000 pulses at the 250 kilocycle (C1) rate. The phases of the wave shaper signals and the command signals are respectively compared, and as long as the phases are not in agreement, motion or positioning will be produced. The direction of motion or positioning is determined by the one of the wave shaper and command signals which has the earlier phase (i.e., which occurs earlier in a given period between 250 cycle pulses from the reference counter 12). However, when the phases agree, motion ceases. If the system is operating properly, this motion ceases when the machine tool or object is at the desired commanded position.

FIGURE 2 shows a more detailed diagram of the reference counter 12 shown in FIGURE 1. Such a counter is known in the art. The reference counter 12 is provided in the system shown in FIGURE 1 to provide pulses having various submultiples of the C1 (250 kilocycle) rate. These pulses at the various submultiple rates are utilized at various points in the system of FIGURE 1. In addition, these pulses are also utilized in the position indicating device of the invention. The reference counter includes three counters for the units, tens, and hundreds decades. Each decade counter is provided with a trigger input T which responds to the transition from a logic 1 to a logic 0. For this reason, the pulses at the C1 rate (which go from a logic 0 to a logic 1) are inverted by an inverter 31. The inverter 31 merely inverts the logic applied to it and produces pulses at a $\overline{C1}$ rate ($\overline{C1}$ indicating the logic inversion of C1). Each decade counter utilizes four flip-flops having weights of one, two, four, and five. Each of the flip-flops has an output terminal 1 and an output terminal 0, these terminals being the logic inversion of one another. Input signals to the units decade are counted, and when a count of 10 is reached, a signal is produced and supplied to the tens decade. When the tens decade reaches a count of 10, a signal is supplied to the hundreds decade. In the units decade, a $\overline{4}$ signal is derived from the output terminal 0 of the four flip-flop, this signal being a logic 0 when a count of four is reached in the units decade. A count of four is reached at the rate of once for each five input signals, hence the designation $\overline{C5}$ (the inversion of C5) is also adjacent the designation $\overline{4}$. The designation C followed by a number indicates a clock rate pulse divided by the number. Thus, a $\overline{C5}$ pulse rate is one fifth the C1 rate (and in this application would be 50 kilocycles). A C10 signal and a $\overline{5}$ signal are also derived from the units decade. In the tens decade, 10, $\overline{10}$, $\overline{20}$, $\overline{40}$, and $\overline{50}$ signals are derived. In the hundreds decade, $\overline{400}$, $\overline{500}$ (also designated as $\overline{C1000}$, and C1000 signals are derived. These signals are utilized in the position indicating device as will be explained.

POSITION INDICATING DEVICE—BRIEF DESCRIPTION

Figure 3A:
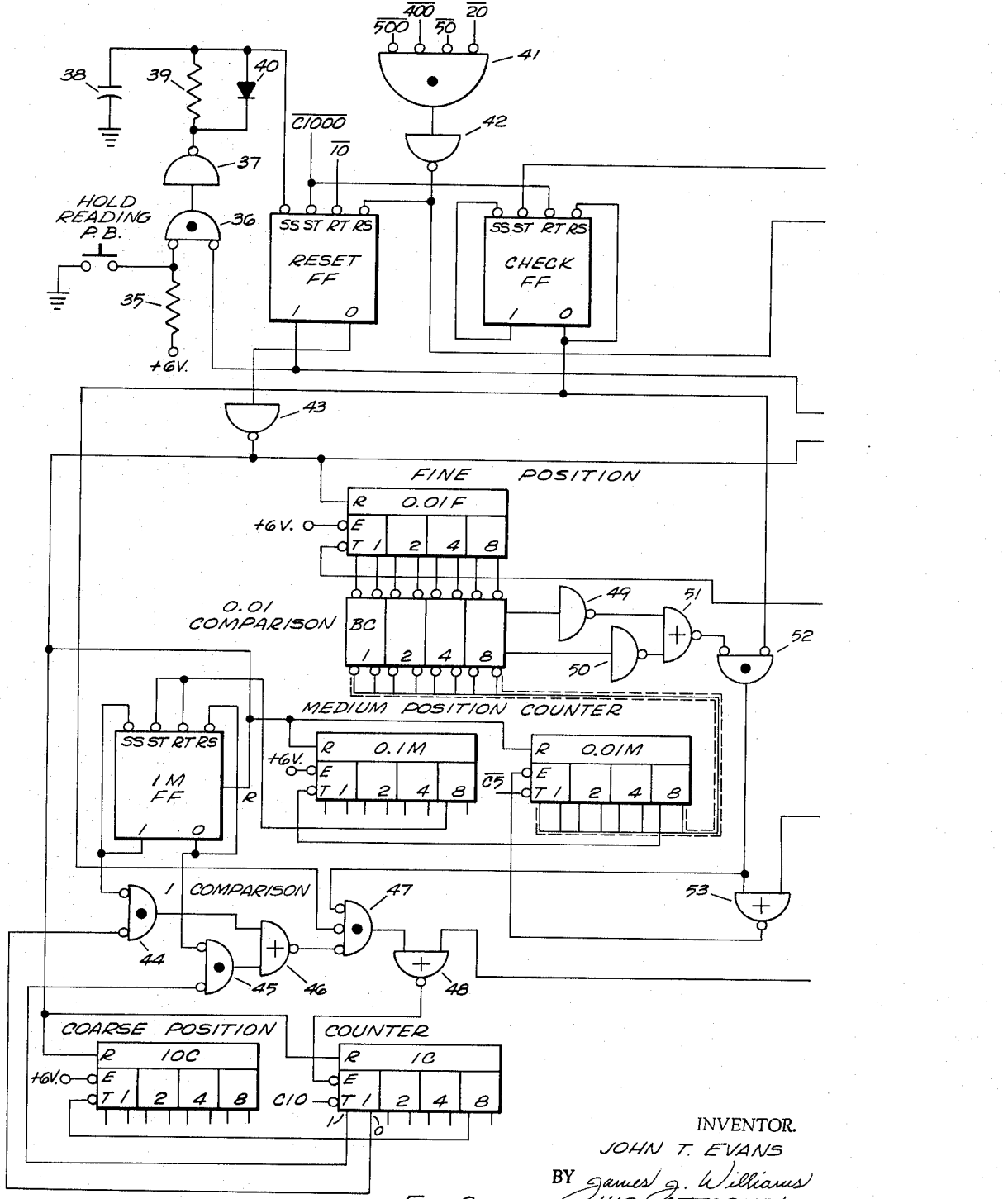
FIGURES 3a and 3b show diagrams of a position indicating device in accordance with the invention.
Figure 3B:
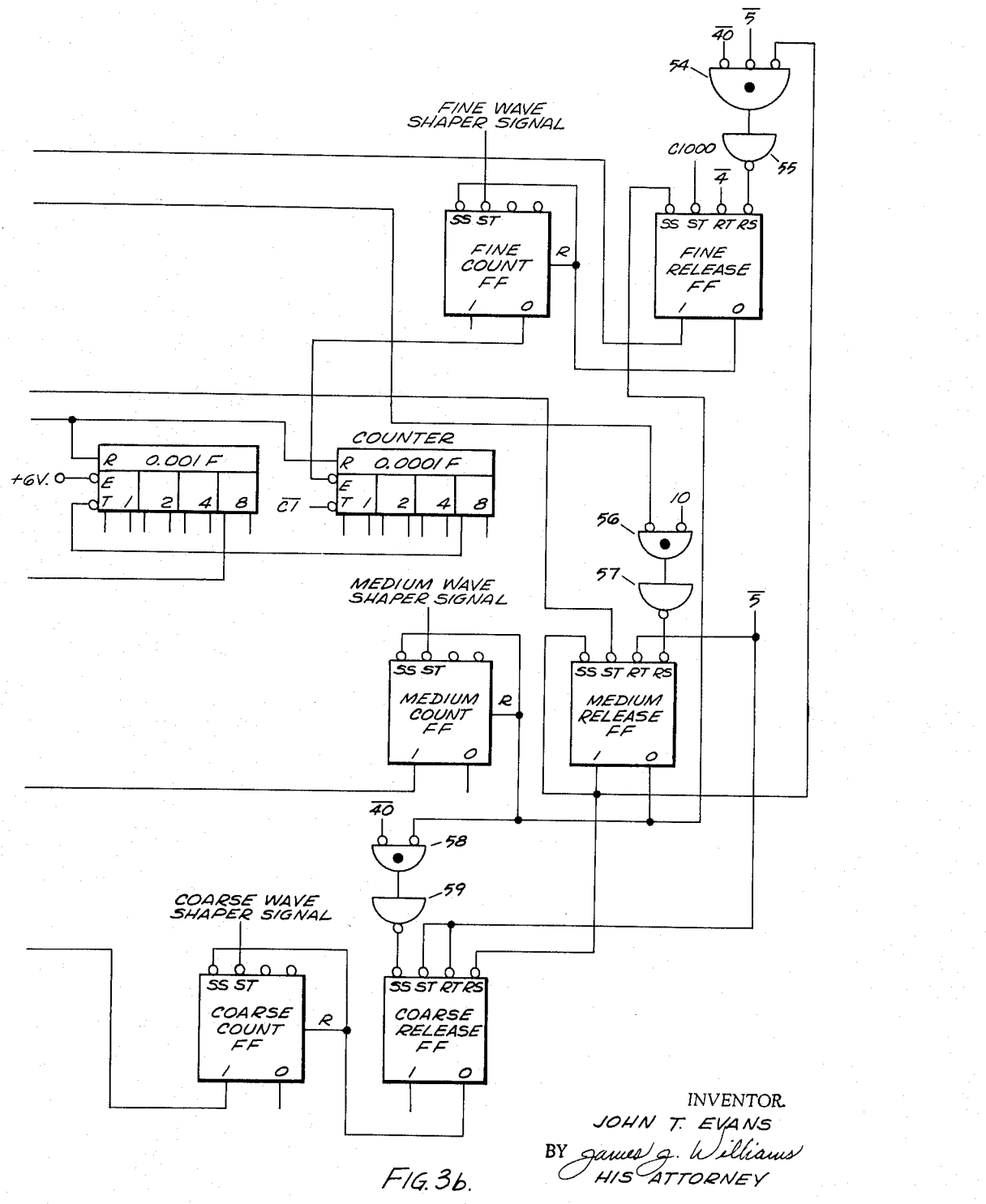

FIGURES 3a and 3b show a diagram of a position indication device in accordance with the invention which is adapted to be used with the numerical positioning control system shown in FIGURES 1 and 2. The two figures have been arranged so that connections which interconnect the two figures line up and correspond with one another. The position indicating device includes a reset flip-flop and associated logic circuitry which starts and stops each operation of the position indicating device. The position indicating device also includes a fine rank position counter comprising three decades designated 0.01F, 0.001F, and 0.0001F; a medium rank position counter comprising a partial decade designated 1M and two decades designated 0.1M and 0.01M; and a coarse rank position counter comprising two decades designated 10C and 1C. Each of the counters includes a release flip-flop and a count flip-flop, the release flip-flop determining the time at which the count flip-flop may be set by recurring signals, and the count flip-flop determining the precise point at which the count begins in response to being set by recurring signals from the wave shapers 20, 21, 22 of FIGURE 1. The release flip-flops also reset the count flip-flops and determine the point at which the counters are disabled and the counting stops. Thus, a fine release flip-flop and a fine count flip-flop are provided for the fine position counter; a medium release flip-flop and a medium count flip-flop are provided for the medium position counter; and a coarse release flip-flop and a coarse count flip-flop are provided for the coarse position counter.

The release flip-flops set and reset at predetermined times which are related to or synchronized with the reference counter pulses at the C1000 rate. These times are shown in the waveforms of FIGURE 4, which are drawn with the C1 pulse rate as their common base. As mentioned above, each of the resolvers produces a position pulse once (at a time or phase indicative of position) during the time of each pulse at the C1000 rate. For this reason, the pulses are synchronized throughout the positioning control system with the C1 rate pulses. This synchronization is present in the C1000 signal which changes between the set and reset states at zero C1 rate pulses, 500 C1 rate pulses, 1,000 (or zero) C1 rate pulses, and so forth. The reset flip-flop is provided with logic circuitry so that it becomes set in response to the 500th pulse at the C1 rate (this being a $\overline{\text{C1000}}$ signal). This setting of the reset flip-flop initiates one operation of the position indicating device. At the 980th pulse at the C1 rate, the reset flip-flop becomes reset. The medium release flip-flop becomes set at the same time. The coarse release flip-flop becomes set slightly later, specifically at the 995th pulse at the C1 rate. The fine release flip-flop becomes set still slightly later, specifically at the 1000th (or 0th) pulse at the C1 rate. After the medium, coarse, and fine release flip-flops have become set, the fine, medium, and coarse count flip-flops may become set and permit counting when these count flip-flops receive signals from their respective wave shapers. The time at which these wave shaper signals are received is determined by or depends upon the position that the machine tool and the resolvers have during that particular pulse at the C1000 rate. When these wave shaper signals are received, the fine, medium, and coarse counters respectively begin to count. At a later time, namely at the 975th pulse at the C1 rate for the medium, at the 985th pulse at the C1 rate for the coarse, and at the 999th pulse at the C1 rate for the fine, the release flip-flops are respectively reset and stop the counting. These reset times are selected so that the medium and coarse position counters initially indicate a position which may have to be increased to agree with the true position. This initially indicated position is later corrected by a comparison so that the medium and coarse position counters finally indicate a position which has incorporated in it the indication in the fine position counter.

After the release flip-flops have been reset, the check flip-flop is set and this initiates the comparison between the ranks, and specifically the comparison between the overlapping significances of the medium and fine ranks and the overlapping significances of the coarse and medium ranks. The 0.01M and 0.01F decade comparison is made first through a comparison circuit which permits the 0.01M decade to receive an additional count until its counts equal the counts in the 0.01F decade. When the counts are equal, the 0.01M decade receives no further counts. Next, the 1C and 1M decade comparison is made through a comparison circuit which permits the 1C decade to receive pulses until its count has the proper number of counts relative to the 1M flip-flop as the 1M flip-flop may have been affected by the first comparison. At this point, the 1C decade receives no further count.

After these comparisons are made, the 10C, 1C, 0.1M, 0.01F, 0.001F, and 0.0001F decades of the counters then have the precise count indicative of the phase conditions of the fine, medium, and coarse resolvers. The counts in these decades may be utilized in any way desired, such as by visually displaying, in decimal form, the number indicated by the counts, or by storing the information on a recording medium so as to provide a recorded command for later use. This display or recorded command is useful where the machine tool or device is first actually positioned (either manually or automatically) at some desired position. This position may be noted or recorded.

POSITION INDICATING DEVICE—DETAILED DESCRIPTION

The position indicating device shown in FIGURES 3a and 3b utilizes a number of logic elements which, although known in the art, will be briefly described. These elements include multiple input NOT AND gates (referred to as NOR gates) such as gates 36, 41, 47. The logic function of these gates is such that if any one of the gate inputs is at a logic 1, then a logic 0 is produced at the gate output; and that if all of the gate inputs are at a logic 0, than a logic 1 is produced at the gate output. The logic elements also include multiple input OR NOT gates (also referred to as NOR gates) such as gate 48. The logic function of these gates is the same as the NOT AND gates, namely that if any one of the gate inputs is at a logic 1, then the gate output is a logic 0; and that if all of the gate inputs are logic 0, then the gate output is a logic 1. The logic elements also include inverters, which were previously mentioned, such as inverter 37 which inverts the logic applied to it. An applied logic 1 is inverted to a logic 0 at the output, and an applied logic 0 is inverted to a logic 1 at the output.

The logic elements also include a number of flip-flops, such as the 1M flip-flop in the medium position counter. These flip-flops have input terminals including a set steering input SS, a set trigger input ST, a reset trigger input RT, a reset steering input RS, a reset input R, and output terminals 1 and 0. When such a flip-flop is set, it is in the one state with its output terminal 1 at a logic 1 and its output terminal 0 at a logic 0. When such a flip-flop is reset, it is in the zero state with its output terminal 1 at a logic 0 and its output terminal 0 at a logic 1. The flip-flop may be reset by the application of a logic 1 at its reset terminal R. The flip-flop may also be controlled by signals at the other input terminals. A logic 0 at the set or reset steering inputs SS or RS for a predetermined time prior to a trigger pulse steers the flip-flop, and permits the flip-flop to be respectively set or reset by a trigger pulse change from a logic 1 to a logic 0 at either the set trigger input ST or the reset trigger input RT. A flip-flop remains set or reset after removal of the signals and until further signals are applied.

The logic elements also include decade counters, such as the 0.0001F decade in the fine position counter. These counters are similar to those shown in FIGURE 2 and previously mentioned, but include four flip-flops having weights of one, two, four, and eight. The set or reset condition of these flip-flops determines or indicates the number of pulses applied. Thus, if the one and two flip-flops are set and the four and eight flip-flops are reset, three pulses have been applied and counted. The flip-flops are arranged so that when a count of 10 is reached, all flip-flops are reset. This count is indicated as a single count in the next more significant decade counter. Each of the decade counters includes three input terminals, a reset input R, an enable input E, and a trigger input T. The flip-flops of a decade counter are reset by the application of a logic 1 to the reset input R. The flip-flops may count when a logic 0 is applied to the enable input E, and the flip-flops count in response to each logic 0 pulse (from a logic 1 state) at the trigger input T. It will be noted that some of the flip-flops are provided with a logic 0 (which in this application is provided by plus six volts) at their enable input E so that these flip-flops are always enabled.

The logic elements also include a bit comparator BC which is utilized in the 0.01 comparison. This comparator has sections weighted one, two, four, and eight to which are coupled the respective flip-flops weighted one, two, four, and eight in the 0.01F decade and in the 0.01M decade. (With respect to the coupling in the 0.01M decade, the connections are indicated by a single line enclosed by dashed lines for the purposes of clarity.) The comparator makes a bit-by-bit (actually a flip-flop by flip-flop state) comparison. If the numbers in the 0.01F and 0.01M decades are all the same, both output signals from the bit comparator BC are at a logic 1. However, if any of the numbers in the 0.01F and 0.01M decades are not equal, then the output signals from the bit comparator BC will be at a logic 0 and a logic 1, the logic 0 corresponding to the higher of the compared numbers.

The position indicating device will be described in connection with the waveforms of FIGURE 4. During and just after obtaining a position indication, the reset flip-flop is in the reset state. The check, release, and count flip-flops were reset after obtaining the position indication. The output terminal 1 of the reset flip-flop is at a logic 0 which is applied to a two-input NOR gate 36. Unless a hold reading push button PB is depressed, a logic 0 (plus six volts) is applied through a resistor 35 to the other input of the gate 36 so that a logic 1 is produced at the output of the gate 36. If the push button PB is depressed, a logic 1 (zero volts) is provided at the input of the gate 36 to cause it to produce a logic 0. This logic 0 is inverted by an inverter 37 to a logic 1 that prevents the reset flip-flop from becoming set and thus holds the position indication. If the push button is not depressed, the gate 36 produces a logic 1 which is inverted to a logic 0 by the inverter 37. This logic 0 (plus six volts) charges a capacitor 38 through a resistor 39 (having a time constant in the order of 0.1 second), and when the capacitor is sufficiently charged, the logic 0 is applied to the set steering input SS. When the next $\overline{C1000}$ signal is received (at the 500th pulse at the C1 rate), the reset flip-flop is set. The output terminal 0 of the reset flip-flop provides a logic 0 which is inverted to a logic 1 by an inverter 43. This logic 1 is applied to all of the reset inputs R in the fine position counter, the medium position counter, and the coarse position counter to reset all decades. The pulses at the C1 rate continue, and when 970 pulses at the C1 rate are counted, the $\overline{500}$, $\overline{400}$, $\overline{50}$, and $\overline{20}$ signals (which are derived from the reference counter shown in FIGURE 2) all produce a logic 0. These signals are applied to a four-input NOR gate 41 so that the gate 41 produces a logic 1 which is inverted by an inverter 42 to a logic 0 which provides reset steering at the reset steering input RS of the reset flip-flop. This same logic 0 is also applied to a two-input NOR gate 56 associated with the medium release flip-flop. The pulses at the C1 rate continue, and when 980 such pulses are counted, a logic 0 is provided by the $\overline{10}$ signal. This logic 0 is coupled to the reset trigger input RT of the reset flip-flop. Thus, the reset flip-flop is reset at the 980th pulse at the C1 rate.

When the reset flip-flop becomes reset, its output terminal 1 provides a logic 0 which is applied to the set trigger input ST of the medium release flip-flop. It will be recalled that all of the flip-flops, including the medium release flip-flop, are reset. Therefore, the medium release flip-flop was provided with set steering since its output terminal 1 supplies a logic 0 to the set steering input SS. Thus, the medium release flip-flop also becomes set at the 980th pulse at the C1 rate.

The medium release flip-flop in the set condition provides a logic 0 at its output terminal 0, this logic 0 being supplied to a two-input NOR gate 58. When 10 additional pulses at the C1 rate have been counted, a count of 990 is reached, and the $\overline{40}$ signal provides a logic 0. This logic 0 is also applied to the gate 58 so that the gate 58 produces a logic 1 which is inverted by an inverter 59 to a logic 0. The coarse release flip-flop is thus provided with a logic 0 at its set steering input SS. When five additional pulses at the C1 rate have been counted, this now being at a count of 995 pulses at the C1 rate, the $\overline{5}$ signal provides a logic 0, this being supplied to both set and reset trigger inputs ST and RT of the coarse release flip-flop. Since the coarse release flip-flop is provided with set steering, this trigger causes the coarse release flip-flop to also become set. Thus, the coarse release flip-flop becomes set at the 995th pulse at the C1 rate.

The medium release flip-flop in the set condition provides a logic 0 to the set steering input SS of the fine release flip-flop. When 1,000 pulses at the C1 rate have been counted, the C1000 signal provides a logic 0 which is supplied to the set trigger input ST of the fine release flip-flop. Thus, the fine release flip-flop becomes set at the 1000th (0th) pulse at the C1 rate.

It will be noted that the output terminal 0 of each of the release flip-flops is coupled to the set steering input SS of their respective count flip-flops. Therefore when each release flip-flop is set, its associated count flip-flop is provided with set steering. The time at which the count flip-flops become set is determined by the time at which the wave shaper signals provide a logic 0, these wave shaper signals being coupled to the respective set trigger inputs ST of the count flip-flops. When the wave shaper signals provide a logic 0, they cause their respective count flip-flops to become set so that the output terminals 0 become a logic 0. The output terminal 0 of the fine count flip-flop is coupled to the enable input E of the 0.0001F decade in the fine position counter. However, the output terminal 1 of the medium count flip-flop is coupled to one input of a two-input NOR gate 53 the output of which is coupled to the enable input E of the 0.01M decade in the medium position counter. Likewise, the output terminal 1 of the coarse count flip-flop is applied to a two-input NOR gate 48, the output of which is coupled to the enable input E of the 1C decade of the coarse position counter. When the fine count flip-flop is set, its output terminal 0 supplies the requisite logic 0 at the enable input E of the 0.0001F decade. When the medium count flip-flop is set, its output terminal 1 provides a logic 1 which causes the gate 53 to produce the requisite logic 0 at the enable input E of the 0.01M decade. And when the coarse count flip-flop is set, its output terminal 1 provides a logic 1 which causes the gate 48 to produce the requisite logic 0 at the enable input E of the 1C decade.

The 0.0001F decade of the fine position counter is supplied with $\overline{C1}$ pulses, and each time such a pulse is received the fine position counter receives a count. The 0.01M decade of the medium position counter receives $\overline{C5}$ pulses and each time such a pulse is received the medium position counter receives a count. And, the 1C decade of the coarse position counter is supplied with C10 pulses, and each time such a pulse is received the coarse position counter receives one count. The three counters continue counting at their respective rates after being enabled. After 970 pulses at the C1 rate, the $\overline{500}$, $\overline{400}$, $\overline{50}$, and $\overline{20}$ signals provide a logic 0 at the inputs of the gate 41 so that the gate 41 produces a logic 1. This logic 1 is inverted to a logic 0 by the inverter 42 and is supplied to a two-input gate 56. The $\overline{10}$ signal is at a logic 0 so that the gate 56 produces a logic 1 which is inverted to a logic 0 by an inverter 57. The medium release flip-flop is thus provided with reset steering at its reset steering input RS. After five more pulses at the C1 rate, this being at the 975th pulse, the $\bar{5}$ signal provides a logic 0 which is supplied to the reset trigger input RT of the medium release flip-flop. The medium release flip-flop is reset, and its output terminal 0 becomes a logic 1. This logic 1 is supplied to the reset input R of the medium count flip-flop and resets the medium count flip-flop so that its output terminal 1 becomes a logic 0. This logic 0 is supplied to the gate 53. As will be explained, the other input of the gate 53 is at a logic 0 so that the gate 53 produces a logic 1 that immediately stops the 0.01M decade of the medium position counter from further counting.

With the medium release flip-flop in the reset condition, its output terminal 1 is at a logic 0. This logic 0 provides reset steering for the coarse release flip-flop. When the $\bar{5}$ signal again becomes a logic 0 (as it will 10 C1 pulses later), a count of 985 will have been reached. The $\bar{5}$ signal provides a reset trigger for the coarse release flip-flop so that the coarse release flip-flop becomes reset. Its output terminal 0 becomes a logic 1 which, when applied to the reset input R of the coarse count flip-flop, causes the coarse count flip-flop to be reset. The output terminal 1 of the coarse count flip-flop becomes a logic 0 which is applied to the gate 48. As will be explained, the other input of the gate 48 is at a logic 0 so that the gate 48 produces a logic 1 that immediately stops the 1C decade of the coarse position counter from further counting.

The output terminal 1 of the medium release flip-flop is also coupled to one input of a three-input NOR gate 54. With the medium release flip-flop reset, this input is at a logic 0. When a count of 995 pulses at the C1 rate is reached, the $\overline{40}$ and $\bar{5}$ signals provide a logic 0 so that all inputs of the gate 54 are at a logic 0. The gate 54 produces a logic 1 which is inverted to a logic 0 by an inverter 55 to provide reset steering at the reset steering input RS of the fine release flip-flop. After four more pulses at the C1 rate, this being at the 999th C1 rate pulse, the $\bar{4}$ signal provides a logic 0 to reset the fine release flip-flop. Its output terminal 0 becomes a logic 1 which, when applied to the reset input R of the fine count flip-flop, resets the fine count flip-flop. The output terminal 0 of the fine count flip-flop becomes a logic 1 which, when supplied to the enable input E of the 0.0001F decade, immediately stops the fine position counter from counting.

In summary, and with reference to FIGURE 4, it will be seen that the reset flip-flop was reset at the 980th C1 pulse, the medium release flip-flop was also set at the 980th C1 pulse, the coarse release flip-flop was set at the 995th C1 pulse, and the fine release flip-flop was set at the 1000th (or 0th) C1 pulse. Sometime after this setting of the medium, coarse, and fine release flip-flops, the wave shaper signals were received to permit the counters to begin counting. Subsequently, the medium release flip-flop was reset at the 975th C1 pulse, the coarse release flip-flop was reset at the 985th C1 pulse, and the fine release flip-flop was reset at the 999th C1 pulse. When the medium, coarse, and fine release flip-flops are reset, the counters are stopped and receive no further counts.

Since the counts in the medium and coarse counters intentionally indicate a position which may have to be increased to reflect the actual position, a comparison between the 0.01M and 0.01F decades (these being the overlapping significances of the medium and fine ranks) is made, and a comparison between the 1C decade and 1M flip-flop (these being the overlapping significances of the coarse and medium ranks) is made. The check flip-flop was previously reset so that its output terminal 1 provides a logic 0 to its set steering input SS. When the fine release flip-flop is reset at the 999th C1 pulse, its output terminal 1 provides a logic 0 to the set trigger input ST of the check flip-flop and sets the check flip-flop. The output terminal 0 of the check flip-flop provides a logic 0 to a two-input NOR gate 52 and to a three-input NOR gate 47. The other input of the gate 52 is coupled to a two-input NOR gate 51, the inputs of which are respectively coupled through inverters 49, 50 to the outputs of the bit comparator BC. If the counts in the 0.01M decade are less than the counts in the 0.01F decade, the upper output terminal of the bit comparator provides a logic 0 which is inverted by the inverter 49 to a logic 1. The gate 51 produces a logic 0 which, with the logic 0 now supplied by the output terminal 0 of the check flip-flop, causes the gate 52 to produce a logic 1. (This logic 1 is supplied to the gate 47 to block that gate 47 while the 0.01 comparison is being made.) This logic 1 is supplied to the gate 53 so that the gate 53 produces a logic 0 which is coupled to the enable input E of the 0.01M decade. The other input of the gate 53 is coupled to the medium count flip-flop output terminal 1 which is at logic 0. The 0.01M decade may thus count additional $\overline{C5}$ pulses. However, as soon as the counts in the 0.01M decade equal the counts in the 0.01F decade, both outputs of the bit comparator BC becomes a logic 1. The inverters 49, 50 change these outputs to logic 0, so that the gate 51 now produces a logic 1. This logic 1 causes the gate 52 to produce a logic 0 so that the gate 53 now has both inputs at a logic 0. The gate 53 produces a logic 1 which, when applied to the enable input E, stops the 0.01M decade from further counting.

The logic 0 produced by the gate 52 stopped the 0.01M decade from further counting. This logic 0 is also supplied to the gate 47. As already mentioned, a second input of the gate 47 is coupled to the output terminal 0 of the check flip-flop which is now at a logic 0 also. The third input of the gate 47 is coupled to a two-input NOR gate 46. The inputs of the gate 46 are respectively coupled to two-input NOR gates 44, 45. The inputs of the gate 44 are coupled to the output terminal 1 of the 1M flip-flop and to the output terminal 0 of the one flip-flop of the 1C decade. The inputs of the gate 45 are coupled to the output terminal 0 of the 1M flip-flop and to the output terminal 1 of the one flip-flop in the 1C decade. The 1 comparison actually determines whether the 1M flip-flop and 1C decade both have an even count or both have an odd count. If both counts are even or both counts are odd, no additional count is provided. However, if the count in the 1M flip-flop is even but the count in the 1C decade is odd, an additional count is provided in the 1C decade to make its count even; and if the count in the 1M flip-flop is odd but the count in the 1C decade is even, an additional count is provided in the 1C decade to make its count odd. For example, assume that the medium position counter has an even count in its 1M decade so that the 1M flip-flop is reset. Since the coarse position counter has received either the same number of pulses or one less pulse, its 1C decade may have an odd count. The one flip-flop of the 1C decade is set. Under these conditions, both inputs to the gate 45 are at a logic 1 and both inputs to the gate 44 are at a logic 0. The gate 44 produces a logic 1 which causes the gate 46 to produce a logic 0. All inputs to the gate 47 are now at a logic 0 so that the gate 47 produces a logic 1. The gate 48 therefore produces a logic 0 which enables the 1C decade to receive additional counts. As soon as the next C10 pulse is received, the 1C decade will have an even count. The one flip-flop of the 1C decade is reset and supplies a logic 0 to the gate 45 and a logic 1 to the gate 44. The reset 1M flip-flop is still supplying a logic 1 to the gate 45 and a logic 0 to the gate 44. Therefore, gate 44 and gate 45 both produce a logic 0. The gate 46 produces a logic 1 which causes the gate 47 to produce a logic 0. Both inputs to the gate 48 are at logic 0 so that the gate 48 produces a logic 1 that stops the 1C decade from further counting. Thus, it will be seen that the 1M flip-flop and the 1C decade are both made to have an even number of counts.

Conversely, if the 1M flip-flop had an odd count and the 1C decade had an even count, the 1C decade would be provided with one additional count in a similar fashion so that both decades would have an odd number of counts.

Both 0.01 and 1.0 comparisons are made while the check flip-flop is in the set condition. It will be recalled that the check flip-flop became set when the fine release flip-flop was reset. When the check flip-flop became set, its output terminal 0 provided a logic 0 at its reset steering input RS. Five hundred C1 pulses later, the $\overline{C1000}$ signal provides a logic 0 which resets the check flip-flop. After this comparison, the information in the counters may be utilized in any way desired. This information is derived from the 10C decade, the 1C decade, the 0.1M decade, the 0.01M or 0.01F decade, the 0.001F decade, and the 0.0001F decade counter. These counters accurately reflect the position, and their counts may, by the use of suitable and known logic circuits, be utilized in any way desired. For example, appropriate logic circuits coupled to the respective flip-flops of these counters may be utilized to illuminate numbers representative of the count. Other utilizations, such as recording, can also be utilized.

After the check flip-flop is reset, the circuit remains with the count in the counters until a new cycle is initiated. A new cycle may be initiated by applying a logic 0 to the set steering input SS of the reset flip-flop, this logic 0 being derived from any desired circuit at any desired time. Such an arrangement would be desirable where the position indication is being recorded. Or, a new cycle may be initiated at predetermined and repeated intervals. In such an arrangement, the interval is determined by the time constant of the resistor 39 and the capacitor 38 associated with the reset flip-flop. As previously mentioned, when the reset flip-flop was reset, and unless the hold reading push button is depressed, both inputs to the gate 36 are at a logic 0. The gate 36 produces a logic 1 and the inverter 37 inverts this to a logic 0 (plus six volts) at its output. The time required for this logic 0 to appear at the set steering input SS is determined by the size of the resistor 39 and the capacitor 38. Typically, this time may be 0.1 second, which is equivalent to 25,000 pulses at the C1 rate. This is ample time for the counting, the comparison and subsequent counting, and the utilization. When the set steering input SS does become a logic 0, the next $\overline{C1000}$ signal sets the reset flip-flop. This resets all counters and their flip-flops so that the position indicating device is again ready to go through another indication cycle as described.

The operation of the position indicating device may be better understood from the example shown in the following table:

*Table 1*

EXAMPLE NUMBER 36.4158 [1]

| Resolver Signal Occurs Between C1 Pulse Numbers | | | Number of Trigger Pulses While Counters Enabled | | | Position Indicator Counter Decade | Count Before Comparison | Count After Comparison |
|---|---|---|---|---|---|---|---|---|
| C | M | F | $\overline{C10}$ C | $\overline{C5}$ M | $\overline{C1}$ F | | | |
| 635–636 | 792–793 | 841–842 | 35 | 37 | 158 | 10C | 3 | [2] 3 |
| | | | | | | 1C | 5 | [2] 6 |
| | | | | | | 1M | 0 | 0 |
| | | | | | | 0.1M | 3 | [2] 4 |
| | | | | | | 0.01M | 7 | 1 |
| | | | | | | 0.01F | 1 | [2] 1 |
| | | | | | | 0.001F | 5 | [2] 5 |
| | | | | | | 0.0001F | 8 | [2] 8 |

EXAMPLE NUMBER 00.0000 [1]

| 999–000 | 999–000 | 999–000 | 99 | 196 | 0 | 10C | 9 | [2] 0 |
|---|---|---|---|---|---|---|---|---|
| | | | | | | 1C | 9 | [2] 0 |
| | | | | | | 1M | 1 | 0 |
| | | | | | | 0.1M | 9 | [2] 0 |
| | | | | | | 0.01M | 6 | 0 |
| | | | | | | 0.01F | 0 | [2] 0 |
| | | | | | | 0.001F | 0 | [2] 0 |
| | | | | | | 0.0001F | 0 | [2] 0 |

[1] Decade numbers on which indication is based.
[2] Indicates actual position is slightly larger.

The first three columns of the table show the actual $\overline{C1}$ pulse numbers (relative to trigger counts received by the reference counter) between which the coarse, medium, and fine resolvers produce their respective signals for the example numbers. The next three columns show the number of trigger pulses C10, $\overline{C5}$, and $\overline{C1}$ which occur while the respective coarse, medium, and fine position counters of the position indicating device are enabled before comparison. The next column designates the position indicating device counter decades, and the next two columns show the counts in these decades before and after the comparisons are made. At the position of 36.4158+ inches the coarse resolver would produce a phase advance which is equivalent to $$\frac{36.4+}{100} \times 1000$$

or 364+ $\overline{C1}$ pulses, this being between the 635th and 636th $\overline{C1}$ pulses. The medium resolver would produce a phase advance which is equivalent to $$\frac{.4158+}{2} \times 1000$$

or 207+ $\overline{C1}$ pulses, this being between the 792nd and 793rd $\overline{C1}$ pulses. The fine resolver would produce a phase advance which is equivalent to $$\frac{.0158+}{.01} \times 1000$$

or 158+ $\overline{C1}$ pulses, this being between the 841st and 842nd $\overline{C1}$ pulses. Thus in the first three columns, the coarse resolver signal is supplied to the coarse count flip-flop between the 635th and 636th $\overline{C1}$ pulses, the medium resolver signal is supplied to the medium count flip-flop between the 792nd and 793rd $\overline{C1}$ pulses, and the fine resolver signal is supplied to the fine count flip-flop between the 841st and 842nd $\overline{C1}$ pulses. With reference to FIGURE 4 and the next three columns of Table 1, the coarse release flip-flop is reset at the 985th $\overline{C1}$ pulse so that the coarse counter counts at the C10 rate, beginning at the 645th $\overline{C1}$ pulses and ending with and including the 985th $\overline{C1}$ pulse, this being 35 C10 pulses. The medium counter counts at the $\overline{C5}$ rate, beginning at the 795th $\overline{C1}$ pulse and ending with and including the 975th $\overline{C1}$ pulse, this being 37 $\overline{C5}$ pulses. The fine counter counts at the $\overline{C1}$ rate, beginning at the 842nd $\overline{C1}$ pulse and ending with and including the 999th $\overline{C1}$ pulse, this being 158 $\overline{C1}$ pulses. The coarse counter receives a count only when a C10 pulse is received so that it receives a count of three in its 10C decade and a count of five in its 1C decade. Likewise, the medium position counter receives a count only when a $\overline{C5}$ pulse is received so that it receives a count of zero in the 1M flip-flop, a count of three in the 0.1M decade, and a count of seven in the 0.01M decade. The fine position counter counts at the $\overline{C1}$ rate and therefore receives 158 counts in its three decades. These counts in the various decades, before the comparison, are indicated.

After the fine, medium, and coarse count flip-flops are reset, the comparison between the overlapping significances of the ranks is made. It will be seen that the 0.01M decade has a count of seven while the 0.01F decade has a count of one so that the 0.01M decade receives an additional four counts. This gives the 0.1M decade a count of four and the 0.01M decade a count of one. After this comparison and count, the 1C decade is compared with the 1M flip-flop. The 1M flip-flop has a count of zero, which is considered even, while the 1C count decade has a count of five which is odd. Therefore, the 1C decade is supplied with one additional count which makes it even. After this comparison, the position indication can be derived from the numbers in the 10C, 1C, 0.1M, 0.01F, 0.001F, and 0.0001F decades. These decades will, as shown in the table, have the proper counts in them so that the proper indication of the number is provided.

Table 1 also shows another example number of 00.0000 to show how the position indicating device eliminates any inaccuracy in the more significant decades. Thus, the count before comparison indicates a number of 99.9000. However, after comparison, the indicated number is 00.0000, this being the proper number.

CONCLUSION

It will be seen that the position indicating device of the invention provides a numerical indication of the phase or time occurrence of recurring signals. Persons skilled in the art will appreciate that various modifications may be made to the position indicating device. For example, more or less resolvers, with more or less comparisons, may be used to accommodate greater or smaller positioning ranges. It will also be appreciated by persons skilled in the art that other times or pulses may be used for setting and resetting. The particular times shown in FIGURE 4 have been found to be practical in the system shown in FIGURE 1. Also, by suitable logic circuits, signals can be provided at predetermined times relative to the recurring reference counter pulses to enable the counters to start the count. Subsequently, the resolver pulses or signals can be permitted to disable the counters to stop the count. Either sequence (namely permitting the resolver signals to start the count and stopping the count at a predetermined time, or starting the count at a predetermined time and permitting the resolver signals to stop the count) can be used. Therefore, while the invention has been described with reference to particular embodiments, it is to be understood that modifications may be made without departing from the spirit of the invention or from the scope of the claims.

What I claim as new and desire to secure by Letters Patent of the United States is:

1. In a system having a plurality of position feedback devices that produce recurring signals having different position significances and having phases relative to a reference signal which are indicative of the position of an object, a position indicating device comprising a plurality of selectively enabled counters of different and overlapping significances, means coupling each of said position feedback devices to a respective one of said counters for respectively permitting said recurring signals to enable said counters at predetermined times relative to said reference signal whereby said counters may count and for respectively and subsequently disabling said counters at predetermined times relative to said reference signal whereby said counters stop counting, means coupled to said counters for comparing said overlapping significances and correcting the counters on the basis of this comparison, and means coupled to said counters for utilizing the corrected count therein.

2. In a system having a plurality of position feedback devices that produce recurring signals having different position significances and having phases relative to a reference signal which are indicative of the position of an object, a position indicating device comprising a plurality of selectively enabled counters of difference and partially overlapping significances, means coupled to said counters for enabling said counters at respective predetermined times whereby said counters may count, means coupling each of said position feedback devices to a respective one of said counters for respectively permitting said recurring signals to disable said counters whereby said counters stop counting, means coupled to said counters for comparing said partially overlapping significances and enabling said counters whereby said counters may count until said partially overlapping significances are substantially conformed, and means coupled to said counters for utilizing the count therein.

3. In a numerical control system having a plurality of position feedback devices that produce recurring signals having different ranks and having phases relative to a reference signal which are indicative of position, a position indicating device comprising a plurality of selectively enabled counters of different ranks, the significance of each counter at least partially overlapping the significance of the counter of the next higher rank, means coupling each of said position feedback devices to a counter of corresponding rank for permitting said recurring signals to enable said counters after predetermined times relative to said reference signal whereby said counters may count and for respectively disabling said counters at predetermined times relative to said reference signal whereby said counters stop counting, means coupled to said counters for respectively comparing the count of said overlapping significances of said counters and producing respective enabling signals in response to any difference in said counts of said overlapping significances, means respectively coupling said enabling signals to said counters whereby, as between any two adjacent ranks, the counter of higher rank counts in response to said enabling signal, and means coupled to said counters for utilizing the count therein.

4. In a numerical control system having a plurality of position feedback devices that produce recurring signals having different ranks and having phases relative to a reference signal which are indicative of position, a position indicating device comprising a plurality of selectively enabled counters of different ranks, the significance of each counter at least partially overlapping the significance of the counter of the next higher rank, means coupled to said counters for enabling said counters at respective predetermined times whereby said counters may count, means coupling each of said position feedback devices to a counter of corresponding rank for respectively permitting said recurring signals to disable said counters whereby said counters stop counting, means coupled to said counters for respectively comparing the count of said overlapping significances of said counters and producing respective enabling signals in response to any difference in said counts of said overlapping significances, means respectively coupling said enabling signals to said counters whereby, as between any two adjacent ranks, the counter of higher rank counts in response to said enabling signal, and means coupled to said counters for utilizing the count therein.

5. In a system having a plurality of position feedback devices that produce recurring signals having different position significances and having phases indicative of the position of an object, a position indicating device comprising a plurality of selectively enabled, multiple element counters of different significances, one element of a first counter having the same significance as one element of a second counter, means coupling each of said position feedback devices to a respective one of said counters for permitting said recurring signals to respectively enable said counters at predetermined times relative to a given one of said recurring signals whereby said counters may count and for respectively and subsequently disabling said counters at predetermined times relative to said given one of said recurring signals whereby said counters stop counting, means coupled to said one element of said first counter and to said one element of said second counter for comparing the counts in said one elements and producing an enabling signal in response to a difference and while a difference exists between the counts in said one elements, means coupling said enabling signal to the one of said first and second counters having the greater significance whereby said one counter may count in response to said enabling signal until said count in said one element of said first counter equals said count in said one element of said second counter, and means coupled to said counters for utilizing the count therein.

6. In a system having a plurality of position feedback devices that produce recurring signals having different position significances and having phases indicative of the position of an object, a position indicating device comprising a plurality of selectively enabled, multiple element counters of different significances, one element of a first counter having the same significance as one element of a second counter, means coupled to said counters for enabling said counters at respective predetermined times whereby said counters may count, means coupling said position feedback devices to a respective one of said counters for respectively permitting said recurring signals to disable said counters whereby said counters stop counting, means coupled to said one element of said first counter and to said one element of said second counter for comparing the counts in said one elements and producing an enabling signal in response to a difference and while a difference exists between the counts in said one elements, means coupling said enabling signal to the one of said first and second counters having the greater significance whereby said one counter may count in response to said enabling signal until said count in said one element of said first counter equals said count in said one element of said second counter, and means coupled to said counters for utilizing the count therein.

7. In a numerical control system having fine, medium, and coarse position devices that produce recurring pulses having fine, medium, and coarse significances and having phases relative to a reference signal which are indicative of the position of said position devices, a position indicating device comprising selectively enabled, multiple element counters of fine, medium, and coarse significances, one element of said fine counter having the same significance as a first element of said medium counter and a second element of said medium counter having the same significance as one element of said coarse counter, first means coupling said fine, medium, and coarse position devices to said fine, medium, and coarse counters respectively for permitting said recurring pulses to respectively enable said fine, medium, and coarse counters at predetermined times relative to said reference signal whereby said counters may count, second means coupled to said first means for respectively disabling said fine, medium, and coarse counters at predetermined times relative to said reference signal whereby said counters stop counting, means coupled to said medium and fine counters for comparing the counts of said one element of said fine counter with the counts of said first element of said medium counter and for enabling said medium counter in response to and for the duration of a difference in said compared counts, means coupled to said coarse and medium counters for comparing the counts of said second element of said medium counter with the counts of said one element of said coarse counter and for enabling said coarse counter in response to and for the duration of a difference in said compared counts, and means coupled to each of said counters for utilizing the count therein.

8. In a numerical control system having fine, medium, and coarse position feedback devices that produce recurring pulses having fine, medium, and coarse significances and having phases relative to a reference signal which are indicative of the position of said position devices, a position indicating device comprising selectively enabled, multiple element counters of fine, medium, and coarse significances, one element of said fine counter having the same significance as one element of said medium counter and one element of said medium counter having the same significance as one element of said coarse counter, means coupled to said counters for enabling said fine, medium, and coarse counters at respective predetermined times whereby said counters may count, means coupling said fine, medium, and coarse position feedback devices to said fine, medium, and coarse counters respectively for permitting said recurring signals to respectively disable said counters whereby said counters stop counting, means coupled to said counters for comparing the counts in said one elements of said medium and fine counters having the same significance and for comparing the counts in said one elements of said coarse and medium counters having the same significance, means coupled to said comparing means and said counters for respectively enabling said medium counter in response to a difference between said compared counts in said medium and fine counters and for enabling said coarse counter in response to a difference between said compared counts in said coarse and medium counters, and means coupled to each of said counters for utilizing the count therein.

9. In a system having fine and coarse position devices that produce recurring pulses having relatively fine and coarse significances and having phases relative to a reference signal which are indicative of the position of said position devices, a position indicating device comprising selectively enabled, multiple element counters of relatively fine and coarse significances, one element of said fine counter having the same significance as one element of said coarse counter, means coupling said fine and coarse position devices to said fine and coarse counters respectively for permitting said recurring pulses to enable said counters after predetermined times relative to said reference signal whereby said counters may count at respective rates and for respectively disabling said counters at predetermined times relative to said reference signal whereby said counters stop counting, means coupled to said fine and coarse counters for comparing the count of said elements having the same significance and producing an enabling signal in response to and for the duration of any difference in the counts of said compared elements, means coupling said enabling signal to said coarse counter whereby said coarse counter counts in response to said enabling signal until the counts in said compared elements are equal, and means coupled to said fine and coarse counters for utilizing the count therein.

10. In a numerical control system having fine, medium, and coarse position feedback devices that produce recurring pulses having fine, medium, and coarse significances and having phases relative to a reference signal which are indicative of the position of said feedback devices, a position indicating device comprising selectively enabled, multiple element counters of fine, medium, and coarse significances, one element of said fine counter having the same significance as one element of said medium counter and one element of said medium counter having the same significance as one element of said coarse counter, means coupling said fine, medium, and coarse feedback devices to said fine, medium, and coarse counters respectively for applying said recurring pulses to said counters and permitting said recurring pulses to enable said counters after predetermined times relative to said reference signal whereby said counters may count at respective rates and for respectively disabling said counters at predetermined times relative to said reference signal whereby said counters stop counting, means coupled to said fine and medium counters for comparing the count of said elements having the same significance and producing a first enabling signal in response to and for the duration of any difference in the counts of said compared elements, means coupling said first enabling signal to said medium counter whereby said medium counter counts in response to said first enabling signal until the counts in said compared elements are equal, means coupled to said medium and coarse counters for comparing the count of said elements having the same significance and producing a second enabling signal in response to and for the duration of a compared difference in the counts of said compared elements, means coupling said second enabling signal to said coarse counter whereby said coarse counter counts in response to said second enabling signal until said compared difference is eliminated, and means coupled to said fine, medium, and coarse counters for utilizing the count therein.

11. In a system having fine, medium, and coarse position feedback devices that produce recurring pulses having fine, medium, and coarse significances and having phases relative to a reference signal which are indicative of the position of said feedback devices, a position indicating device comprising selectively enabled, multiple element counters of fine, medium, and coarse significances, one element of said fine counter having the same significance as one element of said medium counter and one element of said medium counter having the same significance as one element of said coarse counter, means coupling said fine, medium, and coarse feedback devices to said fine, medium, and coarse counters respectively for applying said recurring pulses to said counters and for permitting said recurring pulses to respectively enable said fine, medium, and coarse counters after predetermined times relative to said reference signal whereby said counters may count at respective rates and for subsequently and respectively disabling said fine, medium, and coarse counters at predetermined times relative to said reference signal whereby said counters stop counting, means coupled to said fine and medium counters for comparing the count of said elements having the same significance and producing a first enabling signal in response to and for the duration of any difference in the counts of said compared elements, means coupling said first enabling signal to said medium counter whereby said medium counter counts in response to said first enabling signal until the counts in said compared elements are equal, means coupled to said medium and coarse counters for comparing the count of said elements having the same significance and producing a second enabling signal in response to and for the duration of the counts of said compared elements being odd and even, means coupling said second enabling signal to said coarse counter whereby said coarse counter counts in response to said second enabling signal until the counts in said compared elements are both even or odd, means coupled to said fine, medium, and coarse counters for utilizing the count therein, and means coupled to said fine, medium, and coarse counters for removing the count therein.

12. In a system having fine, medium, and coarse position feedback devices that produce recurring pulses having fine, medium, and coarse significances and having phases relative to a reference signal which are indicative of the position of said feedback devices, a position indicating device comprising selectively enabled, multiple element counters of fine, medium, and coarse significances, one element of said fine counter having the same significance as one element of said medium counter and one element of said medium counter having the same significance as one element of said coarse counter, means coupled to said fine, medium, and coarse counters for enabling said counters at respective predetermined times whereby said counters may count, means coupling said fine, medium, and coarse position feedback devices to said fine, medium, and coarse counters respectively for permitting said recurring signals to disable said counters whereby said counters stop counting, means coupled to said fine and medium counters for comparing the count of said elements having the same significance and producing a first enabling signal in response to and for the duration of any difference in the counts of said compared elements, means coupling said first enabling signal to said medium counter whereby said medium counter counts in response to said first enabling signal until the counts in said compared elements are equal, means coupled to said medium and coarse counters for comparing the count of said elements having the same significance and producing a second enabling signal in response to and for the duration of the counts of said compared elements being odd and even, means coupling said second enabling signal to said coarse counter whereby said coarse counter counts in response to said second enabling signal until the counts in said compared elements are both even or odd, means coupled to said fine, medium, and coarse counters for utilizing the count therein, and means coupled to said fine, medium, and coarse counters for removing the count therein.

13. In a numerical control system having relatively fine and relatively medium position feedback devices that produce recurring pulses having correspondingly fine and coarse significances and having phases related to a reference signal which are indicative of the position of said position devices, a position indicating device comprising selectively enabled, multiple element counters of relatively fine and coarse significances, one element of said relatively fine counter having the same significance as one element of said coarse counter, means coupled to said counters for enabling said fine and coarse counters at respective predetermined times whereby said counters may count, means coupling said fine and coarse position feedback devices to said fine and coarse counters respectively for permitting said recurring signals to respectively disable said counters whereby said counters stop counting, means coupled to said fine and coarse counters for comparing the counts of said elements having the same significance, means coupled to said comparing means and said counters for enabling said coarse counter in response to and for the duration of a difference in said compared counts, and means coupled to said counters for utilizing the count therein.

References Cited by the Examiner
UNITED STATES PATENTS

| | | | |
|---|---|---|---|
| 2,845,613 | 7/1958 | Pawley | 340—183 |
| 2,980,900 | 4/1961 | Rabin | 340—347 |
| 3,023,959 | 3/1962 | Rabin et al. | 235—154 |
| 3,092,718 | 6/1963 | Wullert | 235—154 |

MALCOLM A. MORRISON, *Primary Examiner.*